(12) United States Patent
Lim et al.

(10) Patent No.: US 10,165,854 B2
(45) Date of Patent: Jan. 1, 2019

(54) MODULAR CABINET ASSEMBLY

(71) Applicant: Seville Classics Inc., Torrance, CA (US)

(72) Inventors: Gary M Lim, Palos Verdes Peninsula, CA (US); Yi Min Li, Zhongshan (CN)

(73) Assignee: Seville Classics, Inc., Torrance, CA (US)

( * ) Notice: Subject to any disclaimer, the term of this patent is extended or adjusted under 35 U.S.C. 154(b) by 0 days.

(21) Appl. No.: 15/690,689

(22) Filed: Aug. 30, 2017

(65) Prior Publication Data

US 2018/0055219 A1    Mar. 1, 2018

(30) Foreign Application Priority Data

Aug. 30, 2016   (CN) .................... 2016 2 0994890 U

(51) Int. Cl.
| | | |
|---|---|---|
| *A47B 47/00* | (2006.01) | |
| *A47B 43/00* | (2006.01) | |
| *F16B 12/10* | (2006.01) | |
| *F16B 12/30* | (2006.01) | |
| *F16B 12/34* | (2006.01) | |
| *A47B 57/40* | (2006.01) | |
| *A47B 96/06* | (2006.01) | |

(52) U.S. Cl.
CPC .......... *A47B 47/0091* (2013.01); *A47B 43/00* (2013.01); *F16B 12/10* (2013.01); *F16B 12/30* (2013.01); *F16B 12/34* (2013.01); *A47B 47/0075* (2013.01); *A47B 57/40* (2013.01); *A47B 96/068* (2013.01); *A47B 2220/0072* (2013.01)

(58) Field of Classification Search
CPC ......... A47B 57/06; A47B 57/16; A47B 57/20; A47B 43/00; A47B 47/0091; F16B 12/10
USPC ..................... 312/258, 198, 257.1, 263, 351; 108/106–108; 211/134, 187, 149, 153; 248/220.22, 225.21, 221.11
See application file for complete search history.

(56) References Cited

U.S. PATENT DOCUMENTS

| | | | | |
|---|---|---|---|---|
| 754,816 | A * | 3/1904 | Schriefer | |
| 754,817 | A * | 3/1904 | Schriefer | |
| 892,187 | A * | 6/1908 | Schriefer | |
| 2,483,606 | A * | 10/1949 | Albach | .................. A47B 47/03 312/257.1 |
| 2,909,289 | A * | 10/1959 | Laurie | ..................... A47B 57/16 108/107 |

(Continued)

*Primary Examiner* — Janet M Wilkens
(74) *Attorney, Agent, or Firm* — Raymond Sun

(57) ABSTRACT

A modular cabinet assembly has at least a first sub-cabinet and a second sub-cabinet. Each sub-cabinet includes a back board having at least two separate back board pieces that are pivotably connected to each other, a left side board pivotably connected to one of the at least two back board pieces, and a right side board pivotably connected to another of the at least two back board pieces. At least one shelf board having opposite ends is removably connected to the left side board and the right side board of either the first sub-cabinet or the second sub-cabinet. A first end board is connected to either an upper end of the first sub-cabinet or a lower end of the second sub-cabinet. A first connector removably connects the left side boards of the first and second sub-cabinets, and a second connector removably connects the right side boards of the first and second sub-cabinets.

10 Claims, 9 Drawing Sheets

(56) References Cited

U.S. PATENT DOCUMENTS

| | | | | |
|---|---|---|---|---|
| 3,042,473 | A | * | 7/1962 | Vincens ................ A47B 47/024 |
| | | | | 211/134 |
| 3,065,038 | A | * | 11/1962 | Pipe ...................... A47B 47/03 |
| | | | | 312/263 |
| 3,306,466 | A | * | 2/1967 | Liston .................... A47B 57/16 |
| | | | | 108/107 |
| 3,343,506 | A | * | 9/1967 | Buchbinder ........... A47B 57/16 |
| | | | | 108/107 |
| 4,101,108 | A | * | 7/1978 | Klein ..................... A47B 57/40 |
| | | | | 248/223.31 |
| 4,146,140 | A | * | 3/1979 | Suter ..................... A47B 57/42 |
| | | | | 108/109 |
| 5,382,087 | A | * | 1/1995 | Pouch ................... A47B 43/00 |
| | | | | 160/135 |
| 9,301,603 | B1 | | 4/2016 | Koehn et al. |
| 9,839,286 | B2 | * | 12/2017 | Chuang ................. A47B 43/00 |
| 2003/0173878 | A1 | * | 9/2003 | Youngs ................. A47B 47/02 |
| | | | | 312/257.1 |
| 2008/0084149 | A1 | * | 4/2008 | Ho ........................ A47B 43/00 |
| | | | | 312/258 |
| 2016/0331128 | A1 | * | 11/2016 | Chuang ................. A47B 43/00 |

\* cited by examiner

MODULAR CABINET ASSEMBLY

BACKGROUND OF THE INVENTION

1. Field of the Invention

The present invention is directed to a cabinet assembly, and in particular, to a modular cabinet assembly that can be assembled from a plurality of sub-cabinets.

2. Description of the Prior Art

A cabinet is usually large in size, so it is normally manufactured in component parts to facilitate cost-effective storage, packing and shipping. Existing cabinets usually have side boards, cabinet doors, a back board, a top board and a bottom board that are disassembled and then stacked together, and only connected when needed. Most of the cabinets are usually in a shape of a cube having a height generally much larger than the left and right widths, and the left and right widths generally larger than front and back widths, resulting in very large differences among the sizes of the components and accordingly not being conducive to packaging, storage and transportation. The size of the cabinet after being disassembled and stacked is at least the same as that of the back board, so that the cabinet has a large occupied area and is also not very convenient for carrying around. Moreover, the existing cabinets require users to respectively assemble and fix the components one by one before use, in which the assembly can be very complicated, time-consuming and also subject to error, so that these cabinets are not convenient to use.

SUMMARY OF THE DISCLOSURE

In order to solve the above problems, an object of the present invention is to provide a cabinet which is not only convenient for storage, transportation and packaging, but can also be conveniently assembled or carried around.

The present invention provides a modular cabinet assembly having at least a first sub-cabinet and a second sub-cabinet. Each sub-cabinet includes a back board having at least two separate back board pieces that are pivotably connected to each other, a left side board pivotably connected to one of the at least two back board pieces, and a right side board pivotably connected to another of the at least two back board pieces. At least one shelf board having opposite ends is removably connected to the left side board and the right side board of either the first sub-cabinet or the second sub-cabinet. A first end board is connected to either an upper end of the first sub-cabinet or a lower end of the second sub-cabinet. A first connector removably connects the left side boards of the first and second sub-cabinets, and a second connector removably connects the right side boards of the first and second sub-cabinets.

The present invention provides a number of important benefits. The main cabinet is formed by connecting several sub-cabinets together from the top down, so that the overall space occupied by the back board and the side boards after being disassembled can be effectively reduced. Meanwhile, the back board is formed by pivoting a left back board and a right back board together, so that the back board can be folded in half during disassembly, so as to further reduce the space occupied by the disassembled cabinet so that the entire assembly is convenient for carrying, storage, packing and transportation. In addition, the two side boards are respectively pivoted on the left and right sides of the back board, and all of the two side boards, the left back board and the right back board can rotate about the pivot shafts thereof to be folded during disassembly and folding. During assembly, the two side boards, the left back board and the right back board only need to be quickly unfolded and properly fixed, thereby greatly efficient facilitating disassembly and assembly of the cabinet, making the cabinet easy to use.

DETAILED DESCRIPTION OF THE PREFERRED EMBODIMENTS

Figure 1:
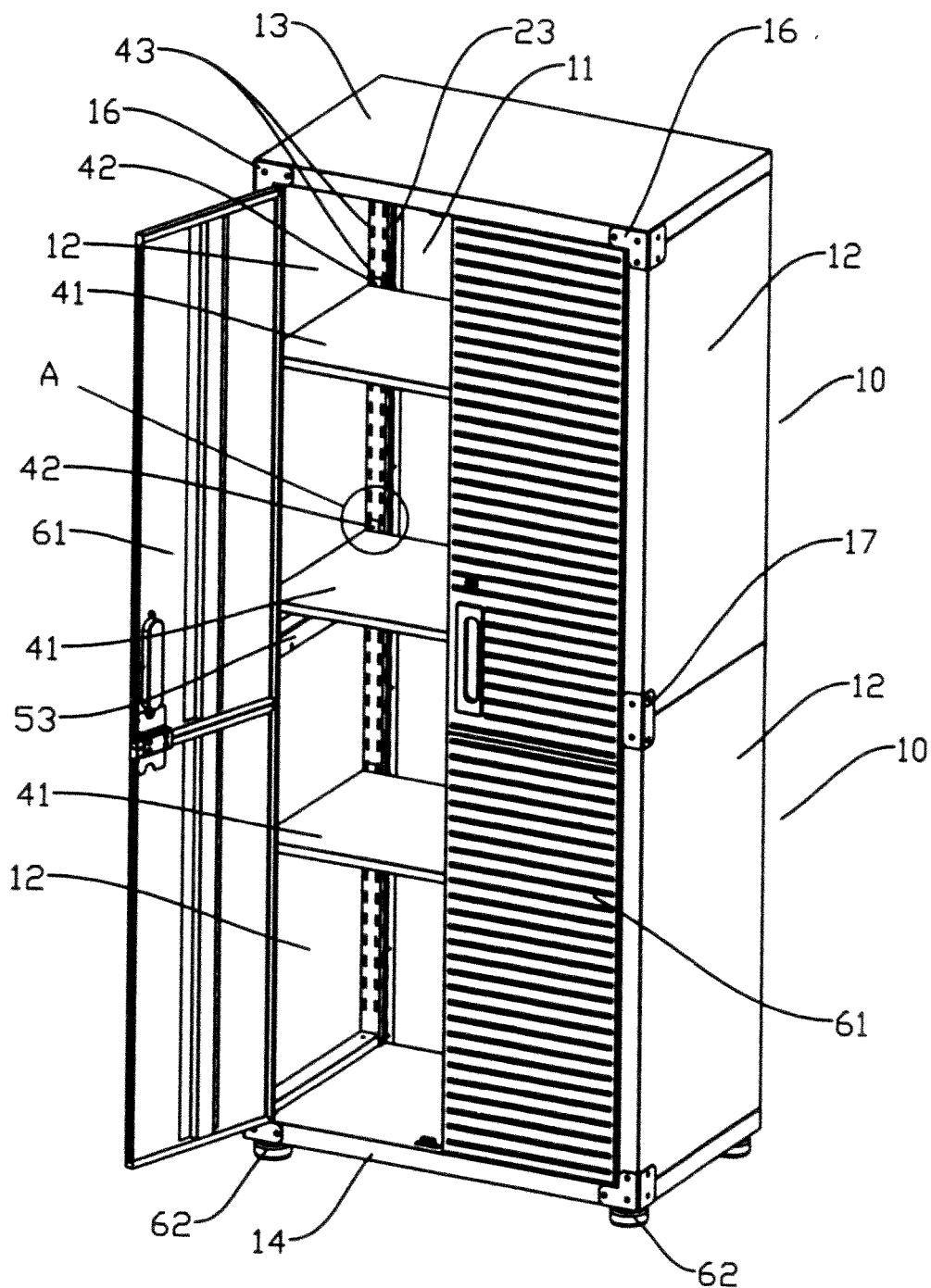
FIG. 1 is a perspective view of a cabinet according to one embodiment of the present invention.
Figure 2:
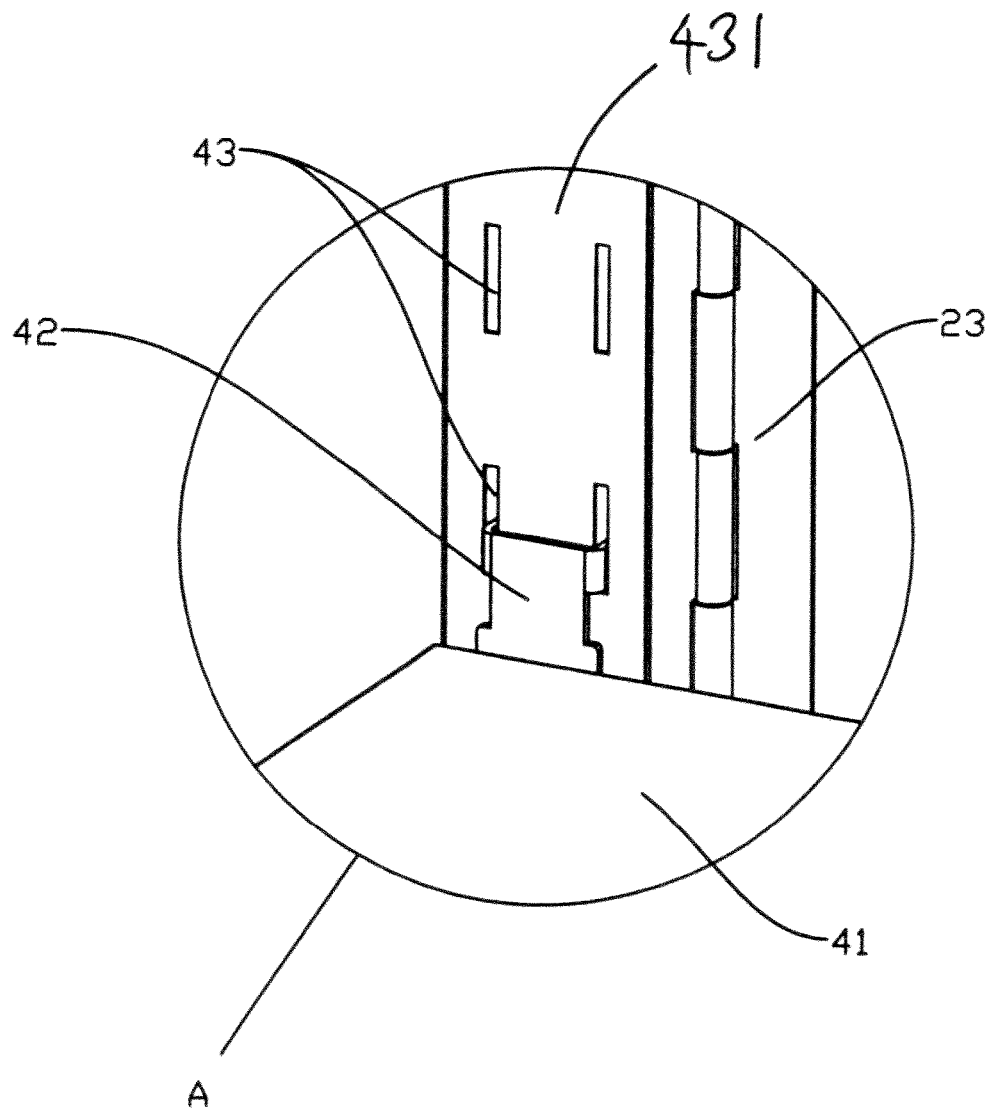
FIG. 2 is an enlarged view of the area A in FIG. 1.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

With reference to FIGS. 1-9, a combination cabinet is provided, including a main cabinet which includes several sub-cabinets 10 connected together from the top down. The sub-cabinets 10 include a back board 11 and two side boards 12. The two side boards 12 are respectively pivoted on the left and right sides of the back board 11 through a first longitudinal pivot shaft 21 of a piano hinge 23, and the back board 11 includes a left back board 111 and a right back board 112 pivoted together through a second longitudinal pivot shaft 22 of a piano hinge 24. See FIG. 9. The main cabinet is formed by connecting several sub-cabinets 10 together from the top down, so that the overall area or space occupied by the back board 11 and the side boards 12 after being disassembled can be effectively reduced. Meanwhile, the back board 11 is formed by pivoting a left back board 111 and a right back board 112 together, so that the back board 11 can be folded in half during disassembly, to further reduce the area or space occupied by the disassembled cabinet, so that the entire assembly is convenient for carrying, storage, packaging and transportation. On the other hand, the two side boards 12 are respectively pivoted on the left and right sides of the back board 11, during disassembly and folding, so that all of the two side boards 12, the left back board 111, and the right back board 112, can pivot or rotate around the pivot shafts thereof to be folded. During assembly, the two side boards 12, the left back board 111 and the right back board 112 can be easily and simply unfolded and properly fixed in place, thereby greatly facilitating disassembly and assembly of the cabinet.

In the present invention, the first pivot shaft 21 is a rotating shaft of a first piano hinge 23 having two connecting sheets that are respectively fixed on an inner end wall of the back board 11 and along a rear edge of a side board 12. In addition, the left and right side walls of the back board 11 are respectively abutted to the inner end walls of the side boards 12. The second pivot shaft 22 is a rotating shaft of a second piano hinge 24 and positioned between the right side wall of the left back board 111 and the left side wall of the right back board 112. In this way, during folding, the two side boards 12, the left back board 111 and the right back board 112 can be folded in an M shape, so that the structure on the inner wall can be prevented from being exposed, and so as to minimize bump damage to the internal structure of the cabinet, while maintaining an aesthetic appearance. During unfolding, the rotating angles of the two side boards 12, the left back board 111 and the right back board 112 can be limited by the surfaces of the respective boards 111, 112 and 12, so that it is convenient for unfolding and folding, and the structural strength of the cabinet can also be improved.

The present invention further includes at least one transverse end board (e.g., boards 13 and 14 described below) mounted on the main cabinet, and a connecting board 15 that is adapted to be connected to an end board is provided on the main cabinet. Each end board has an inner surface that is adapted to be abutted to the connecting board 15, and at least one clamping hole 32 is formed on the connecting board 15. See FIG. 4. Each clamping hole 32 has a varying-shape cross-section with a larger end and a smaller end. A clamp 31 (which is adapted to be coupled to a corresponding clamping hole 32) is provided on the end board and includes an elastic clamping portion 311 which is spaced with a distance from the edge of the end board. See FIG. 6. The clamping portion 311 and the smaller end of the clamping hole 32 are longitudinally aligned, then the end board (e.g., 14 in FIG. 6) is clamped together with the connecting board 15 to fix the end board to the main cabinet. The end board may transversely slide relative to the connecting board 15, to enable the clamping portion 311 and the larger end of the clamping hole 32 to be aligned, and the clamping portion 311 may longitudinally pass through the larger end of the clamping hole 32. In this way, during unfolding and assembly, the end boards can be aligned to be mounted on the main cabinet, simply by aligning each clamping portion 311 on the end board and the larger end of the corresponding clamping hole 32 and then longitudinally inserting the clamping portion 311 into the larger end of the clamping hole 32, and then by pushing the end board to transversely move relative to the main cabinet, to enable the clamping portions 311 to transversely move to the smaller end of the corresponding clamping holes 32. During disassembly, only the reverse operation is required, so that the end board is pushed to transversely move relative to the main cabinet, to enable the clamping portions 311 to transversely move from the smaller end of the corresponding clamping holes 32 to the larger end of the clamping holes 32 from which the clamping portions 311 can be removed.

Thus, when compared with a traditional screw fixing connection, there is no need to align and screw down multiple screws one by one, thereby making it very convenient to disassemble and assemble the cabinet in a time-saving manner, while also minimizing the likelihood of assembly error. In this embodiment, there are two end boards which are respectively a top board 13 mounted on the top of the main cabinet, and a bottom board 14 mounted at the bottom of the main cabinet. In actual use, the number of connections and the mounting positions of the end boards can be flexibly adjusted as required. In addition, the locations of the clamp 31 and clamping hole 32 can be reversed, with the clamp 31 provided on the main cabinet, and the clamping hole 32 provided on the end board.

Figure 4:
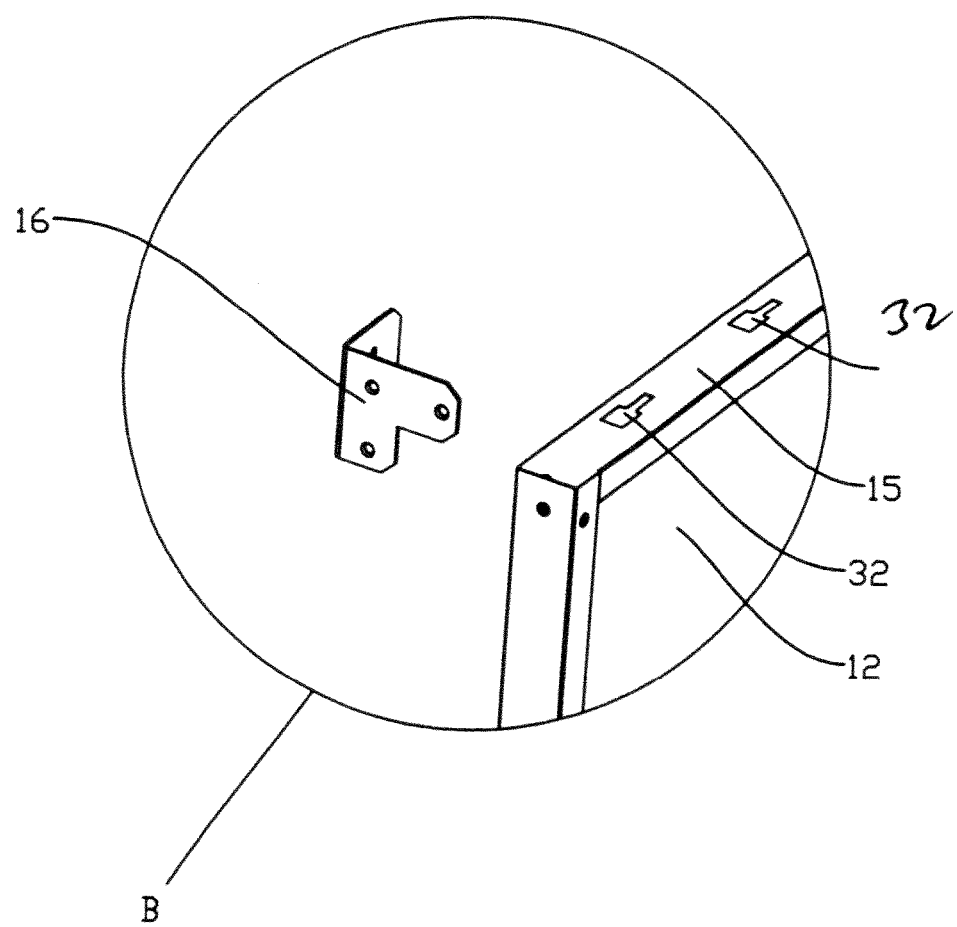
FIG. 4 is an enlarged view of the area B in FIG. 3.

As best shown in FIG. 4, the larger end of the clamping hole 32 faces the front of the main cabinet. The clamp 31 further includes at least one connecting portion 312 configured to connect the clamping portion 311 and the connecting board 15, and the connecting portion 312 can be abutted to the rear inner wall of the smaller end or the rear inner wall of the larger end of the clamping hole 32, so as to restrict the distance to which the end board can slide backwards relative to the connecting board 15, thereby facilitating positioning of the end board during assembly. The present invention further includes at least one locking piece 16 which is detachably and fixedly connected to the main cabinet and the end board at the same time so as to restrict movement between the main cabinet and the end board to a transverse relative sliding therebetween, so that the end boards are prevented from becoming loose, disconnected and falling down, thereby improving the structural strength of the cabinet.

The present invention further includes at least one shelf board 41 which is arranged inside the main cabinet and can be detachably suspended on the main cabinet through several hooks 42. See FIGS. 2 and 7-8. Each hook 42 has at least one first barb 421 opening downwardly and at least one second barb 422 opening upwardly provided thereon, and in the embodiment shown in FIGS. 2 and 7-8, a pair of first barbs 421 and a single second barb 422 is provided. A plurality of pairs of aligned first hook holes 43 is formed on the opposing end surfaces 431 of each side board 12, and the first barbs 421 are adapted to be hooked in one pair of first hook holes 43 to hang the hook 42 on the main cabinet. A second hook hole 44 is formed on the bottom of the shelf board 41, and the second barb 422 is adapted to be hooked in the second hook hole 44 to suspend the shelf board 41 on the hook 42. In this way, the shelf board 41 can be manually disassembled and assembled without using any tools, and the structure is simple and easy to use. In this embodiment, the pairs of hook holes 43 are longitudinally spaced apart along the surfaces 431, and the pairs of first barbs 421 can be hooked in different pairs of first hook holes 43 to change the height of the hooks 42 hanging on the surface 431, in order to be able to flexibly and conveniently adjust the space configuration of the cabinet for convenient use.

Figure 3:
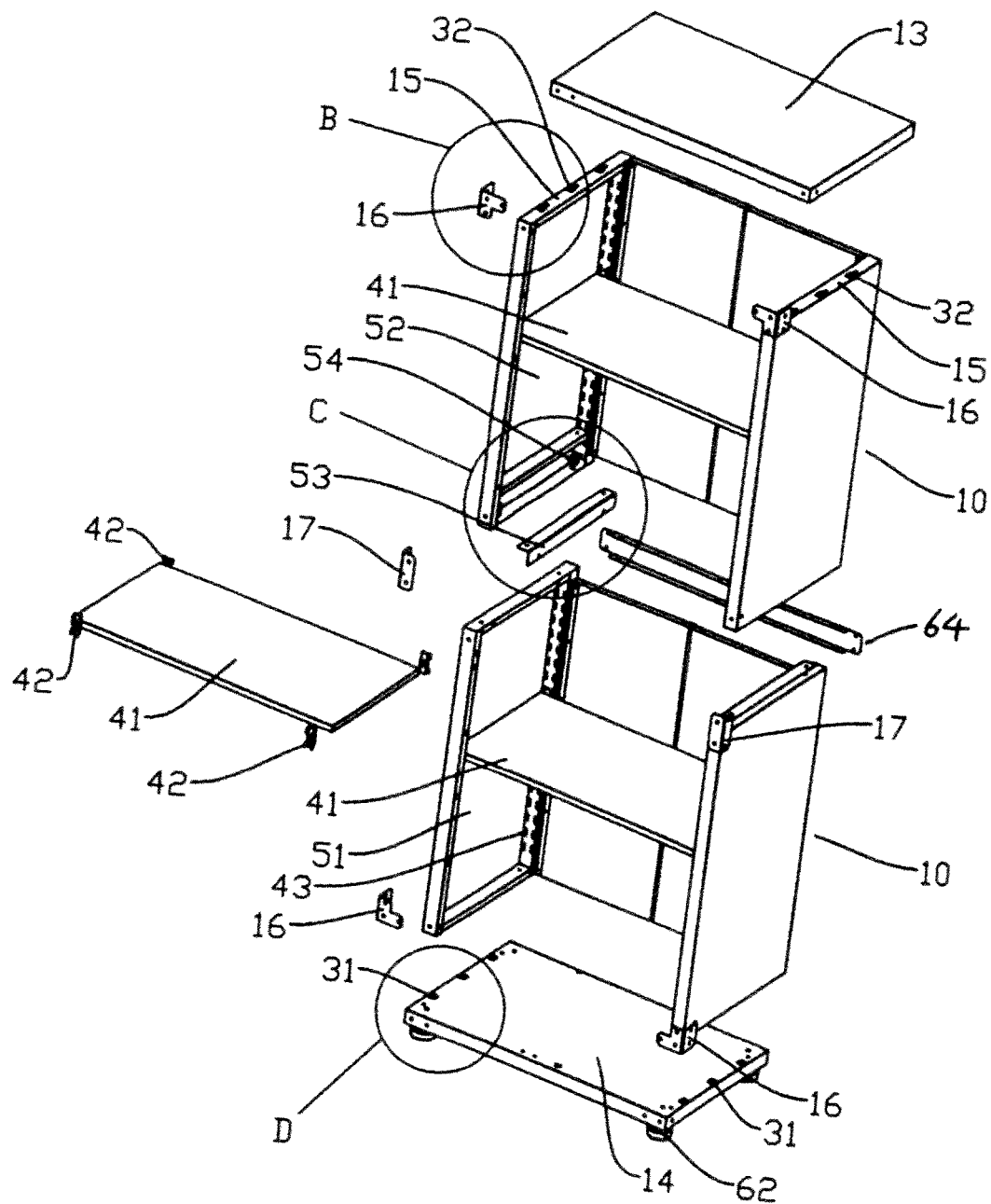
FIG. 3 is an exploded perspective view of the cabinet of FIG. 1.
Figure 5:
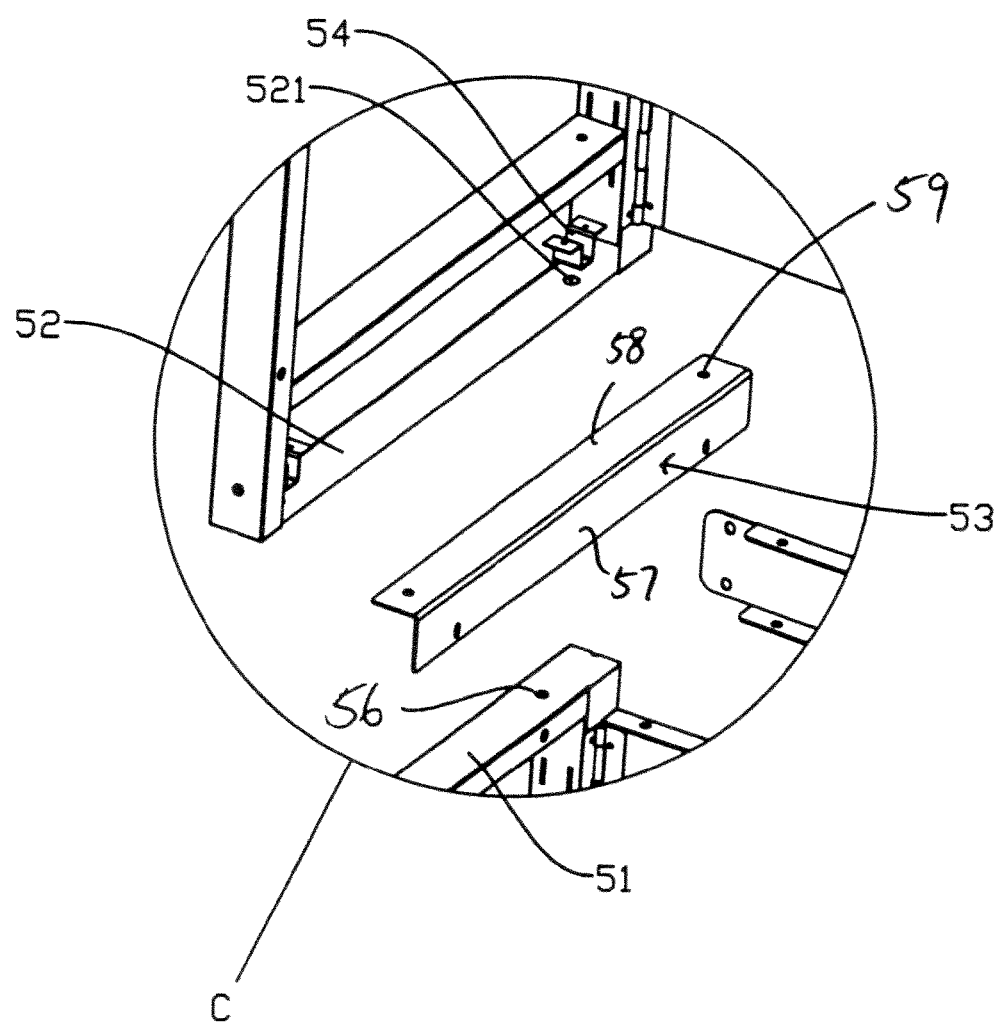
FIG. 5 is an enlarged view of the area C in FIG. 3.
Figure 6:
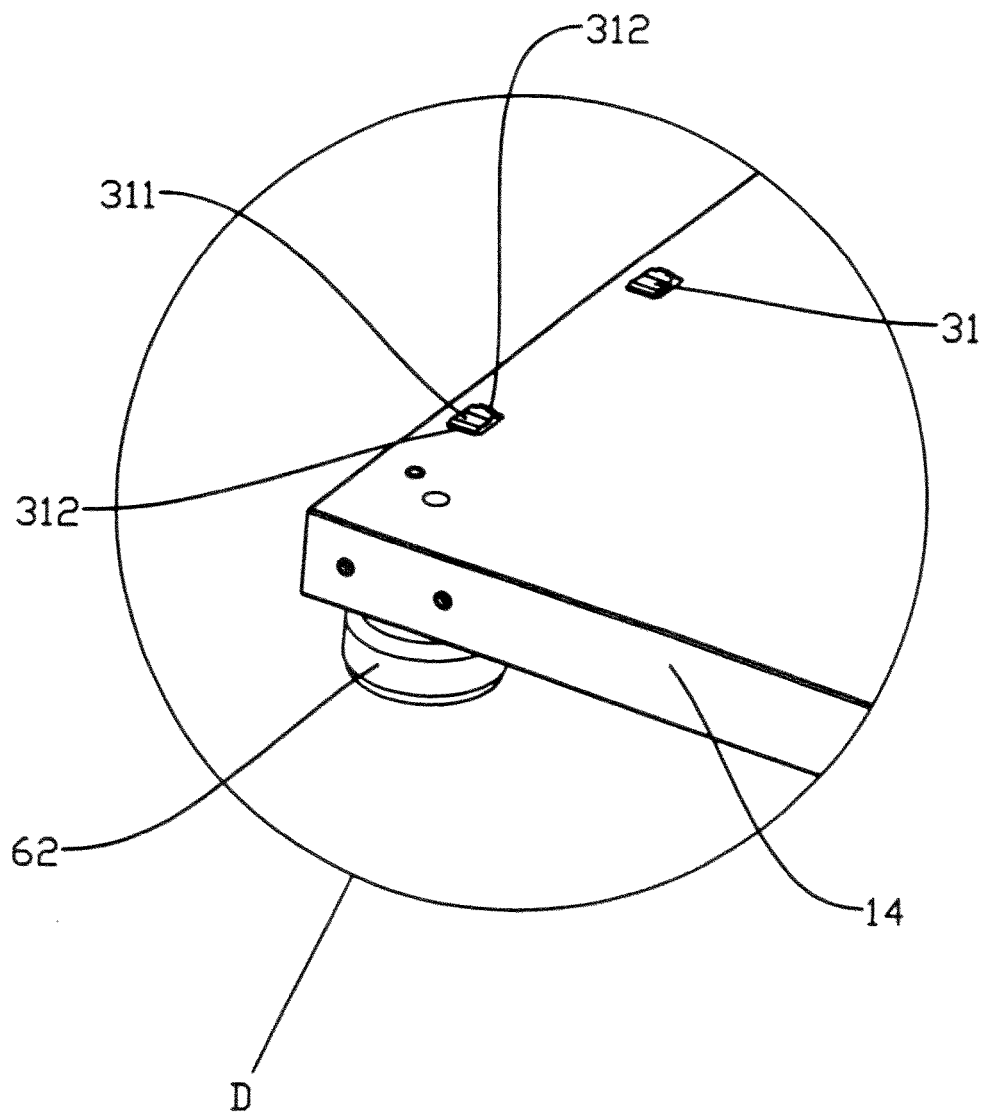
FIG. 6 is an enlarged view of the area D in FIG. 3.
Figure 7:
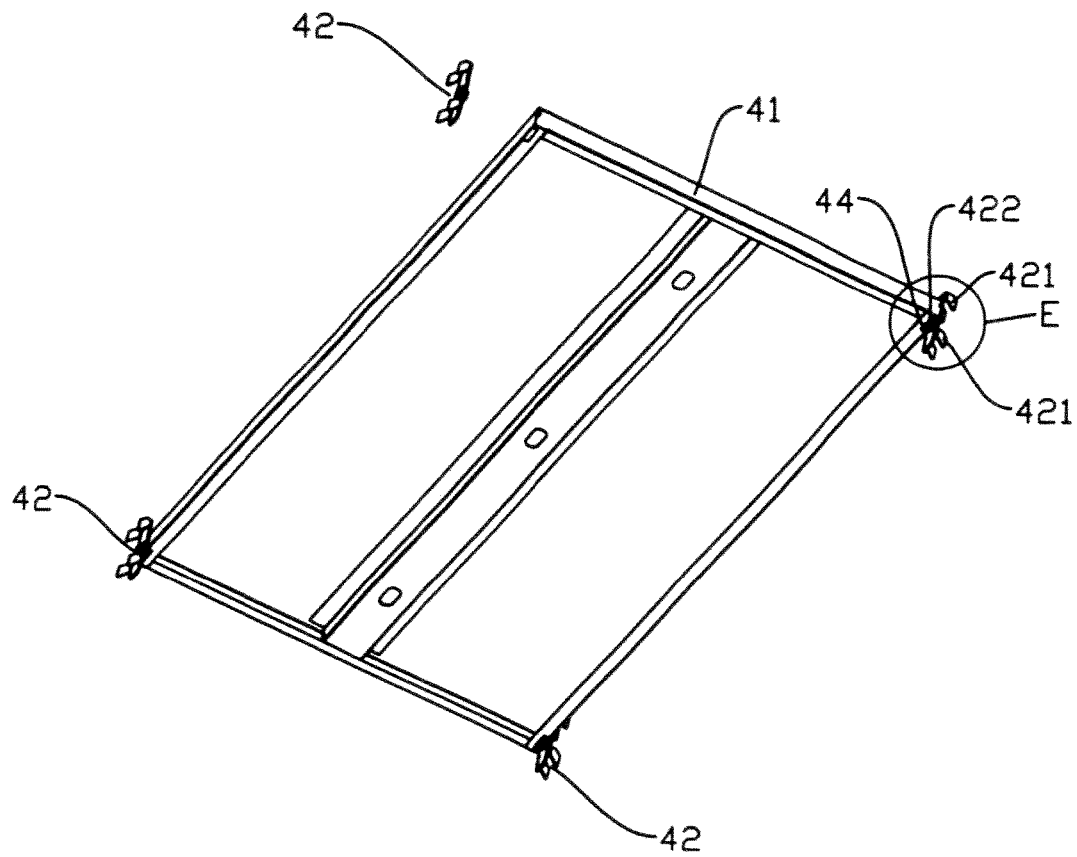
FIG. 7 is a perspective view of a middle board and a hook of the cabinet of FIG. 1.
Figure 8:
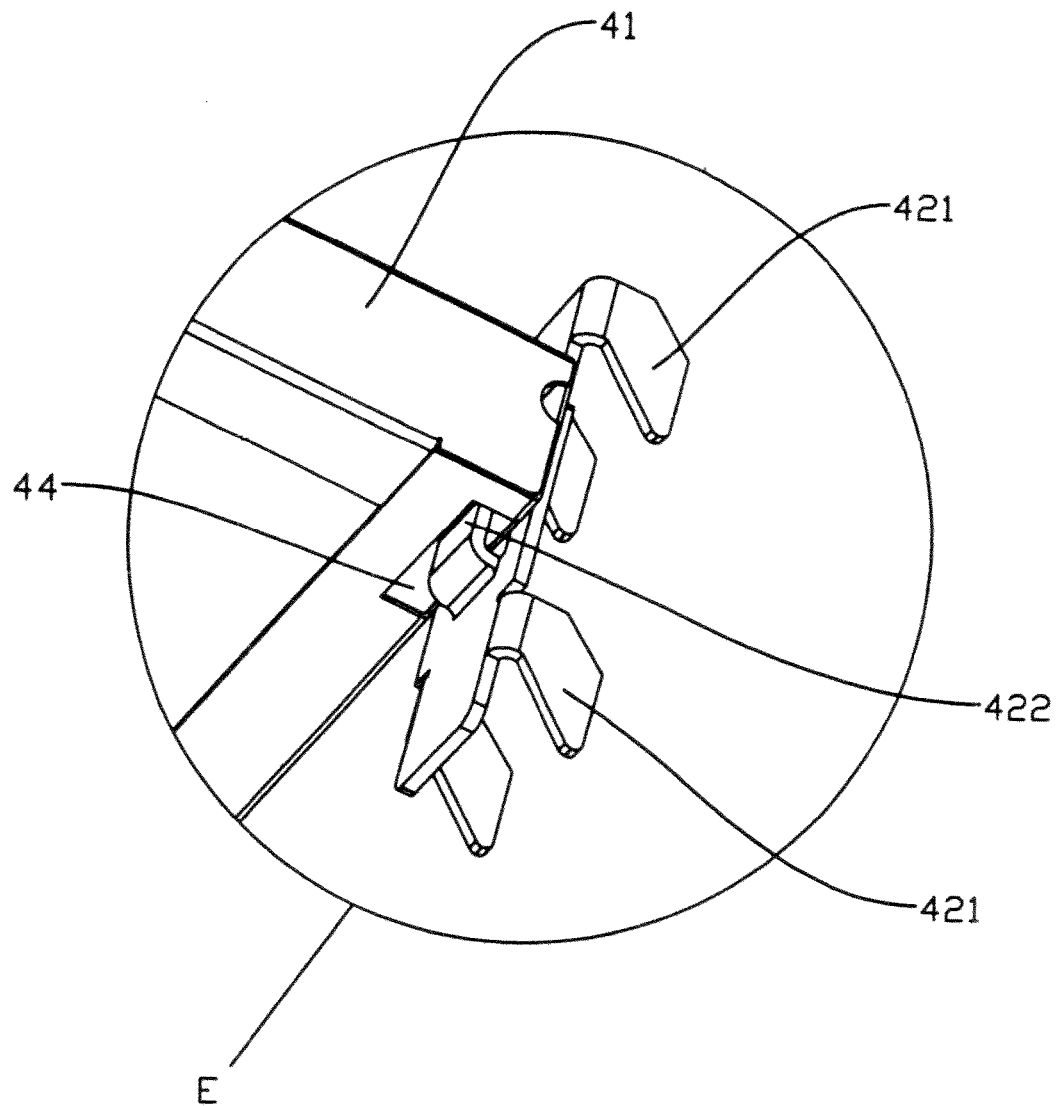
FIG. 8 is an enlarged view of the area E in FIG. 7.
Figure 9:
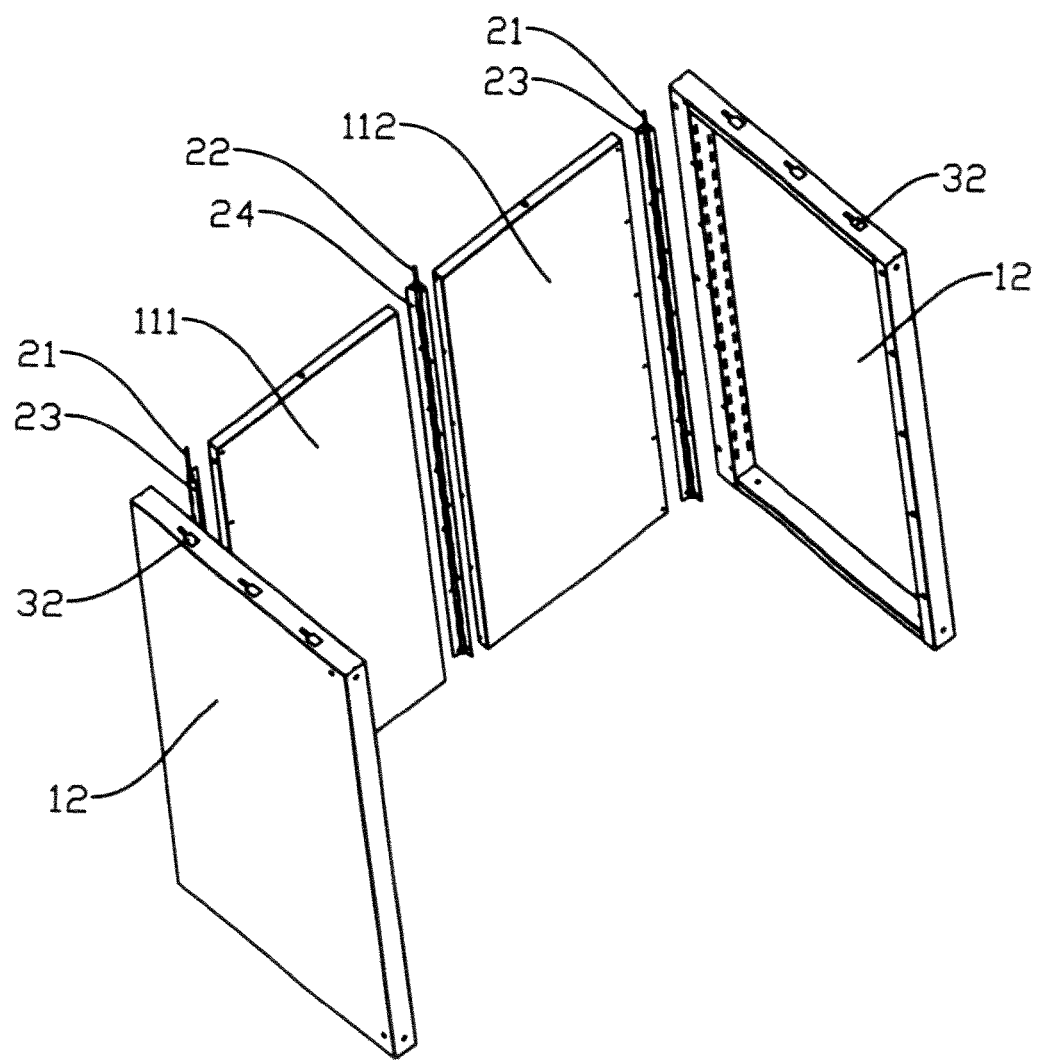
FIG. 9 is an exploded perspective view of one of the sub-cabinets of the cabinet of FIG. 1.

With reference to FIG. 3 and FIG. 5, one of the two longitudinally adjacent side boards 12 is defined as a first side board 51, and the other one is defined as a second side board 52. The first side board 51 and the second side board 52 are fixed together through a connecting angle board 53 having a longitudinal flange 57 fixedly connected to the first side board 51 through a plurality of first transverse screws (not shown) and tightly abutted against the side end wall of the first side board 51, and a transverse flange 58 (transverse to the longitudinal flange 57) of the connecting angle board 53 is abutted against a bottom wall of the second side board 52. The second side board 52 is positioned between the transverse flange 58 of the connecting angle board 53 and the first side board 51. Positioning holes 521 are formed on the bottom wall of the second side board 52. At least one elastic pressing member 54 is provided above the transverse flange 58 of the connecting angle board 53 and the second side board 52, and the transverse flange 58 of the connecting angle board 53 presses the second side board 52 on the first side board 51 through the elastic pressing member 54. Each tail of a plurality of second screws (not shown) is extended through a hole (not shown) in the pressing member 54, a correspondingly aligned hole 59 on the transverse flange 58, through the correspondingly aligned positioning hole 521, and then another hole 56 on the top of the first side board 51.

This connection structure is simple and easy for processing and assembling, and can also prevent the side boards 12 from being deformed due to excessive stress.

At least one baffle board 17, which is located at a joint of the two longitudinally adjacent side boards 12 and fixedly connected to the side boards 12 at the same time, is provided on an outer wall of the cabinet, and the baffle board 17 covers the outside corners of the side boards 12, in order to be able to further improve the structural strength of the cabinet, to prevent sharp edges and corners of the side boards 12 from scratching users, and to improve the safety performance of the cabinet. Moreover, in this embodiment, cabinet doors 61 are mounted on the front end of the main cabinet and supporting feet 62 mounted at the bottom of the main cabinet, which are commonly used structures in this art, so they are not described in detail.

The cabinet of the present invention can be assembled and disassembled in a quick and convenient manner. First, the back board 11 and side boards 12 are unfolded for each sub-cabinet 10. Next, if the user desires to stack multiple sub-cabinets 10, then the longitudinally adjacent side boards 51 and 52 are connected together using the connecting angle board 53 in the manner described above in connection with FIGS. 3 and 5. In addition, an optional bridging member 64 (see FIG. 3) can be positioned between the bottom edge and the top edge of adjacent back boards 11 to facilitate connection of the bottom edge and top edge to the bridging member 64. This is done for as many sub-cabinets 10 are desired to be stacked to form the main cabinet. Third, the end boards 13 and 14 are connected in the manner described above in connection with FIGS. 4 and 6. Fourth, the shelf boards 41 are connected in the manner described above in connection with FIGS. 2 and 7-8. Finally, doors 61 are installed to the front of the main cabinet. Each door 61 can be sized and shaped to be about the same as the back boards 111 and 112 so that the doors 61 and back boards 111 and 112 can be stacked together when packed and stored.

To disassemble the main cabinet, the doors 61 are first uninstalled and removed. Next, the shelf boards 41 can be removed by disengaging the hooks 42 without the use of any tools. The end boards 13 and 14 are also removed without the need to use any tools as the clamps 31 can be conveniently and quickly slid out of the corresponding clamping holes 32. Finally, the longitudinally adjacent side boards 51 and 52 are separated from the connecting angle board 53 by unscrewing the screws that extend through the aligned holes in the pressing member 54, the transverse flange 58, and the first side board 51. The side boards 12 and the back boards 111 and 112 can then be folded via their pivot shafts 21 and 22.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A modular cabinet assembly, comprising:
    a first sub-cabinet and a second sub-cabinet, each sub-cabinet comprising:
        a back board having at least two separate back board pieces that are pivotably connected to each other;
        a left side board pivotably connected to one of the at least two back board pieces; and
        a right side board pivotably connected to another of the at least two back board pieces;
    at least one shelf board having opposite ends removably connected to the left side board and the right side board of either the first sub-cabinet or the second sub-cabinet;
    a first end board connected to either an upper end of the first sub-cabinet or a lower end of the second sub-cabinet; and
    a first connector that removably connects the left side boards of the first and second sub-cabinets, and a second connector that removably connects the right side boards of the first and second sub-cabinets;
    wherein each left side board and each right side board has an upper end and a lower end, and a connecting board provided at each upper end and each lower end of each left and right side board, further including a first connecting mechanism provided at each connecting board, and a second connecting mechanism provided adjacent an edge of the first end board, wherein the first connecting mechanism is a clamping hole that has a varying cross-section with a larger end and a smaller end, and the second connecting mechanism is a clamp having an elastic clamping portion, with the clamp adapted to be coupled to a corresponding clamping hole.

2. The assembly of claim 1, further including a second end board connected to the other of the upper end of the first sub-cabinet or the lower end of the second sub-cabinet.

3. The assembly of claim 1, further including a plurality of hooks that are adapted to removably connect the at least one shelf board to opposite ends of the left side board and the right side board, wherein each hook has at least one first barb opening downwardly and at least one second barb opening upwardly, further including:
    at least one hook hole formed on opposing end surfaces of each of the left side board and the right side board, with the at least one first barb adapted to be hooked in the at least one hook hole; and
    a second hook hole formed on a bottom of the at least one shelf board, with the second barb adapted to be hooked in the second hook hole.

4. The assembly of claim 1, wherein each of the first and second connectors is angled.

5. The assembly of claim 4, wherein each angled connector has a longitudinal flange, and a transverse flange connected to the longitudinal flange.

6. A modular cabinet assembly, comprising:
    a first sub-cabinet and a second sub-cabinet, each sub-cabinet comprising:
        a back board having at least two separate back board pieces that are pivotably connected to each other;
        a left side board pivotably connected to one of the at least two back board pieces; and
        a right side board pivotably connected to another of the at least two back board pieces;
    at least one shelf board having opposite ends removably connected to the left side board and the right side board of either the first sub-cabinet or the second sub-cabinet;
    a first end board connected to either an upper end of the first sub-cabinet or a lower end of the second sub-cabinet; and
    a first connector that removably connects the left side boards of the first and second sub-cabinets, and a second connector that removably connects the right side boards of the first and second sub-cabinets;
    wherein each left side board and each right side board has an upper end and a lower end, and a connecting board provided at each upper end and each lower end of each left and right side board, further including a first connecting mechanism provided at each connecting board, and a second connecting mechanism provided adjacent an edge of the first end board, wherein the second connecting mechanism is a clamping hole that has a varying cross-section with a larger end and a smaller end, and the first connecting mechanism is a clamp having an elastic clamping portion, with the clamp adapted to be coupled to a corresponding clamping hole.

7. The assembly of claim 6, further including a second end board connected to the other of the upper end of the first sub-cabinet or the lower end of the second sub-cabinet.

8. The assembly of claim 6, further including a plurality of hooks that are adapted to removably connect the at least one shelf board to opposite ends of the left side board and the right side board, wherein each hook has at least one first barb opening downwardly and at least one second barb opening upwardly, further including:
- at least one hook hole formed on opposing end surfaces of each of the left side board and the right side board, with the at least one first barb adapted to be hooked in the at least one hook hole; and
- a second hook hole formed on a bottom of the at least one shelf board, with the second barb adapted to be hooked in the second hook hole.

9. The assembly of claim 6, wherein each of the first and second connectors is angled.

10. The assembly of claim 9, wherein each angled connector has a longitudinal flange, and a transverse flange connected to the longitudinal flange.

* * * * *